United States Patent
Ren

(10) Patent No.: US 11,099,436 B2
(45) Date of Patent: Aug. 24, 2021

(54) METHOD AND APPARATUS FOR MANUFACTURING AN ALIGNMENT FILM

(71) Applicant: Shenzhen China Star Optoelectronics Semiconductor Display Technology Co., Ltd., Shenzhen (CN)

(72) Inventor: Wei Ren, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 415 days.

(21) Appl. No.: 15/744,439

(22) PCT Filed: Dec. 20, 2017

(86) PCT No.: PCT/CN2017/117329
§ 371 (c)(1),
(2) Date: Oct. 4, 2018

(87) PCT Pub. No.: WO2019/100493
PCT Pub. Date: May 31, 2019

(65) Prior Publication Data
US 2019/0155109 A1    May 23, 2019

(30) Foreign Application Priority Data
Nov. 22, 2017    (CN) .......................... 201711177694.6

(51) Int. Cl.
*G01B 11/06* (2006.01)
*G02F 1/1337* (2006.01)

(52) U.S. Cl.
CPC ........ *G02F 1/133788* (2013.01); *G01B 11/06* (2013.01); *G01B 11/0625* (2013.01)

(58) Field of Classification Search
CPC .......... G02F 1/133788; G01B 11/0625; G01B 11/06
See application file for complete search history.

(56) References Cited

U.S. PATENT DOCUMENTS

2015/0123011 A1* 5/2015 Huang .................. G02F 1/1303
250/436
2015/0227056 A1* 8/2015 Hur ....................... G02F 1/1303
355/67

FOREIGN PATENT DOCUMENTS

CN    1591135 A    3/2005
CN    102221758 A   10/2011
(Continued)

*Primary Examiner* — Jacob T Minskey
*Assistant Examiner* — Adrien J Bernard
(74) *Attorney, Agent, or Firm* — Crowell & Moring LLP

(57) ABSTRACT

The present disclosure provides a method and an apparatus for manufacturing an alignment film. The method may include: forming an alignment material layer on a substrate; moving the substrate at a first speed and irradiating perpendicularly the alignment material layer with a first light emitted by a light source; moving the substrate at a second speed and irradiating the alignment material layer with a second light emitted by the light source, wherein a first angle between an incident direction of the second light and the substrate may prevent interference of an incident light and a reflected light of the alignment material layer. Therefore, the implementation of the present disclosure may improve the uniformity of the alignment capacity of the alignment film.

16 Claims, 4 Drawing Sheets

(56) References Cited

FOREIGN PATENT DOCUMENTS

| | | | |
|---|---|---|---|
| CN | 102346337 | A | 2/2012 |
| CN | 103033988 | A | 4/2013 |
| CN | 103399431 | A | 11/2013 |
| CN | 105044989 | A | 11/2015 |
| JP | 2007114267 | A | 5/2007 |
| JP | 2010134069 | A | 6/2010 |

* cited by examiner

METHOD AND APPARATUS FOR MANUFACTURING AN ALIGNMENT FILM

CROSS-REFERENCE TO RELATED APPLICATIONS

The present application is a 35 U.S.C. § 371 National Phase conversion of International (PCT) Patent Application No. PCT/CN2017/117329, filed on Dec. 20, 2017, which claims foreign priority to Chinese Patent Application No. 201711177694.6, filed on Nov. 22, 2017 in the State Intellectual Property Office of China, the entire contents of which are hereby incorporated by reference.

TECHNICAL FIELD

The present disclosure generally relates to the display field, and in particular to a method and an apparatus for manufacturing an alignment film.

BACKGROUND

The liquid crystal display panel has many advantages such as low voltage, low power consumption, abundance of display information and being capable of display colorful images. It is widely used for different electronic devices, for example, electronic computers, electronic notebooks, mobile phones, cameras, high definition TV etc.

Alignment process during manufacturing of liquid crystal display panel is quite important for the product quality. Among different technologies, photo-alignment is usually employed. Specifically, a prepared CF substrate and a prepared TFT substrate may be irradiated with a polarized light having a certain direction such that an alignment angle may be formed on the alignment material of the substrate.

It is noticed that, because the incident light may interfere with the reflected light during photo-alignment, the light amount accumulated at different portions of the alignment material may be different. Therefore the alignment capacity and the image display lightness may be non-uniform over the display panel, which causes display quality reduction.

SUMMARY

The present disclosure provides a method for manufacturing an alignment film so as to improve the uniformity of alignment capacity of an alignment film.

To solve the above mentioned problem, a technical scheme adopted by the present disclosure is to provide a method for manufacturing an alignment film. The method includes: forming an alignment material layer on a substrate; measuring thickness of different portions of the alignment material layer; determining a first angle based on the thickness of the different portions of the alignment material layer, wherein the first angle prevents interference of an incident light and a reflected light of the alignment material layer; moving the substrate at a first speed and irradiating perpendicularly the alignment material layer with a first light emitted by a light source; moving the substrate at a second speed and irradiating the alignment material layer with a second light emitted by the light source, wherein an angle between an incident direction of the second light and the substrate is equal to the first angle; moving the substrate at a third speed and irradiating the alignment material layer with a third light emitted by the light source, wherein an angle between an incident direction of the third light and the substrate is equal to a second angle, and the second angle prevents interference of an incident light and a reflected light of the alignment material layer; wherein, when the first angle is an acute angle, the second angle is an obtuse angle; when the first angle is an obtuse angle, the second angle is an acute angle.

To solve the above mentioned problem, another technical scheme adopted by the present disclosure is to provide a method for manufacturing an alignment film. The method includes: forming an alignment material layer on a substrate; moving the substrate at a first speed and irradiating perpendicularly the alignment material layer with a first light emitted by a light source; moving the substrate at a second speed and irradiating the alignment material layer with a second light emitted by the light source, wherein a first angle between an incident direction of the second light and the substrate prevents interference of an incident light and a reflected light of the alignment material layer.

To solve the above mentioned problem, another technical scheme adopted by the present disclosure is to provide an apparatus for manufacturing an alignment film. The apparatus includes: motion-mechanism, for a placement of a substrate with an alignment material layer and configured to move the substrate; irradiation-mechanism, configured to emit light for irradiating the alignment material layer on the substrate to form the alignment film having alignment function; wherein, the motion-mechanism moves the substrate successively at a first speed and a second speed, when the motion-mechanism moves the substrate at the first speed, the irradiation-mechanism perpendicularly irradiates the alignment material layer with a first light; when the motion-mechanism moves the substrate at the second speed, the irradiation-mechanism irradiates the alignment material layer with a second light, a first angle between an incident direction of the second light and the substrate prevents interference of an incident light and a reflected light of the alignment material layer.

The method for manufacturing an alignment film may include: forming an alignment material layer on a substrate; moving the substrate at a first speed and irradiating perpendicularly the alignment material layer with a first light emitted by a light source; moving the substrate at a second speed and irradiating the alignment material layer with a second light emitted by the light source, wherein a first angle between an incident direction of the second light and the substrate prevents interference of an incident light and a reflected light of the alignment material layer. The implementation of the present disclosure may provide additional light amount for the fringe area of the substrate which receives less light amount from the first light due to the perpendicular irradiation direction. Therefore, the uniformity of the light amount accumulated over the alignment material and the alignment capacity of the alignment film may be improved. Moreover, the non-uniformity of lightness of display image due to alignment problem may also be reduced or avoided.

BRIEF DESCRIPTION OF THE DRAWINGS

To describe the technical solutions in the embodiments of the present invention more clearly, the following accompanying drawings for describing the embodiments are briefly introduced. Apparently, the accompanying drawings in the following description show merely some embodiments of the present invention. For those skilled in the art, other drawings can also be obtained based on these drawings without any creative work.

DETAILED DESCRIPTION

The disclosure will now be described in detail with reference to the accompanying drawings and examples. Apparently, the embodiments described are merely a portion but not all of the embodiments of the present disclosure. Embodiments obtained by those skilled in the art based on the embodiments of the present disclosure without creative efforts should all belong to the protection scope of the present disclosure.

Figure 1:
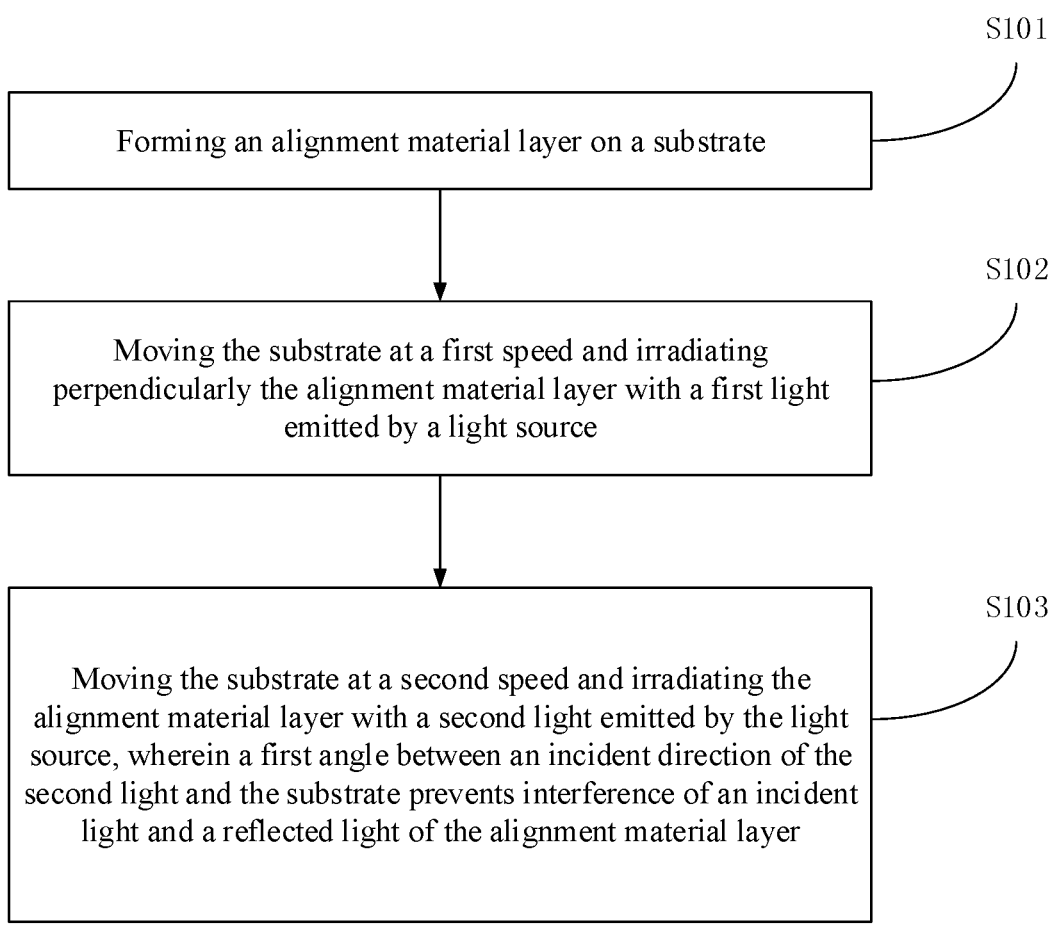
FIG. 1 is a flow chart of the method for manufacturing an alignment film according to an embodiment of the present disclosure.

Referring to FIG. 1, FIG. 1 is a flow chart of the method for manufacturing an alignment film according to an embodiment of the present disclosure. The method may include the following blocks.

S101: Forming an alignment material layer 21 on a substrate 20.

Figure 2:
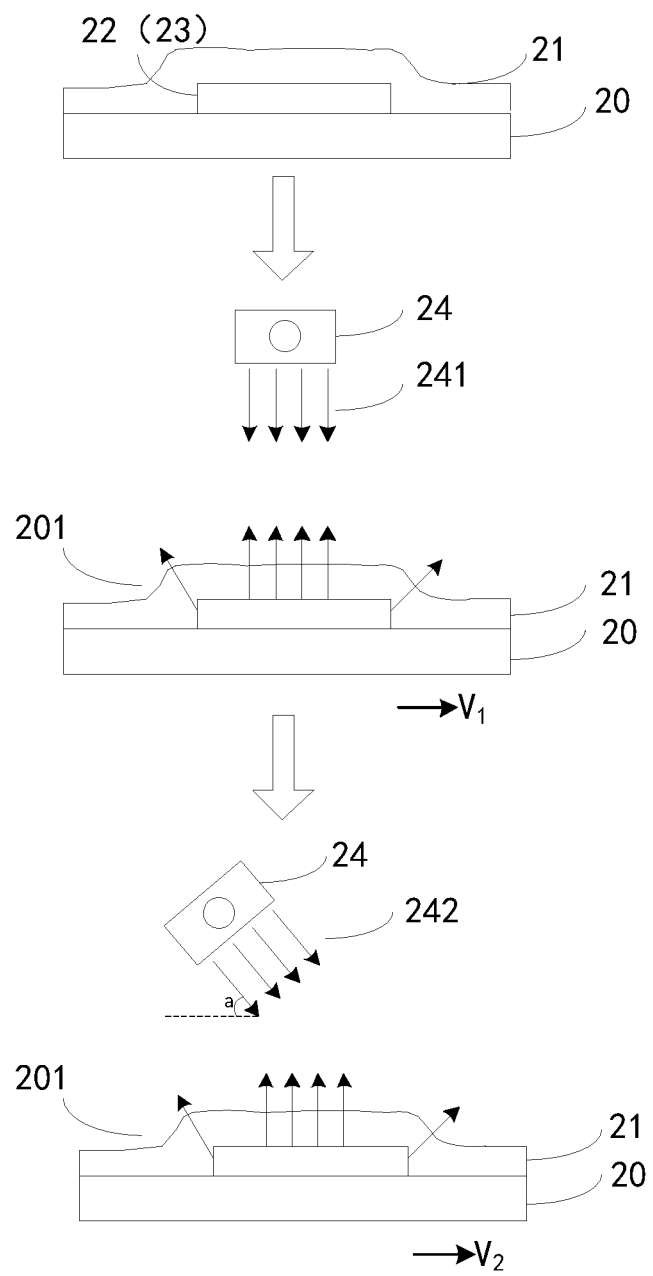
FIG. 2 illustrates the blocks S101 to S103 of the alignment film manufacturing method of FIG. 1.

Referring also to FIG. 2, FIG. 2 illustrates the blocks S101 to S103 of the alignment film manufacturing method of FIG. 1. Firstly, an alignment material layer 21 may be formed on the substrate 20. When being irradiated by polarized light, the alignment material layer 21 may form the alignment film having alignment capacity. Optionally, the polarized light may be linearly polarized ultraviolet (UV) light. Optionally, the alignment material layer 21 may be formed with polymer, such as polyimide (PI).

In some embodiment, the substrate 20 may be an array substrate or a CF substrate. Specifically, when the substrate 20 is an array substrate, the substrate 20 may include multiple pixel electrodes (ITO slit) 22. When the substrate 20 is a CF substrate, the substrate 20 may include a photo spacer (PS) 23. It should be understood that, whether the substrate 20 is an array substrate or a CF substrate, due to the existence of the pixel electrode 22 or the photo spacer 23, the surface of the whole alignment material layer 21 is not completely flat.

S102: Moving the substrate 20 at a first speed $V_1$ and irradiating perpendicularly the alignment material layer 21 with a first light emitted by a first light 241 emitted by a light source 24.

Specifically, the light source 24 may emit polarized light. Optionally, the polarized light may be linearly polarized UV light. The first light 241 may be perpendicularly irradiated on the alignment material layer 21. Because the surface of the whole alignment material layer 21 is not completely flat (different portions of the alignment material layer 21 have different thickness), when the first light 241 is perpendicularly irradiated on the alignment material layer 21, a fringe area 201 of the alignment material layer 21 may form different alignment angles and the incident light reaching at these positions may have different phases which result in interference of the incident light and the reflected light at the fringe area 201. Correspondingly, the light amount accumulated at the fringe area 201 of the substrate 20 may be less than that of other positions. For the whole alignment material 21, the non-uniformity of accumulated light amount may cause non-uniformity of alignment capacity. If this kind of substrate is utilized for manufacturing a display panel, the brightness of its display image will also be non-uniform and its contrast will be reduced.

To solve this problem, the block 5103 may be provided according to this embodiment of the present disclosure.

S103: Moving the substrate 20 at a second speed $V_2$ and irradiating the alignment material layer 21 with a second light 242 emitted by the light source 24, wherein a first angle a between the incident direction of the second light 242 and the substrate 20 may prevent interference of the incident light and the reflected light of the alignment material layer 21.

Due to the existence of the first angle a between the incident direction of the second light 242 and the substrate 20, the incident light and the reflected light of the alignment material layer 21 may be located on different planes. Thus, the incident light will not interfere with the reflected light of the alignment material layer 21, such that additional light may be provided to the fringe area 201 which in block S102 receives less mount of light because of the interference of the incident light and the reflected light. Therefore, the uniformity of the accumulated light amount and the alignment capacity of the alignment film may be improved.

In the above-mentioned alignment film manufacturing method, the light source 24 may provide the first light 241 and the second light 242 to irradiate the alignment material layer 21. The first light 241 may be perpendicularly irradiated on the alignment material layer 21 while the angle between the incident direction of the second light 242 and the substrate 20 is equal to the first angle a which may prevent interference of the incident light and the reflected light of the alignment material layer 21. Thus, additional light may be provided to the fringe area 201 which receives less light amount from the first light 241 due to the perpendicular irradiation direction. Therefore, the uniformity of the accumulated light amount and the alignment capacity of the alignment film may be improved. Moreover, the non-uniformity of lightness of display image due to alignment problem may also be reduced or avoided.

In one embodiment, the alignment film manufacturing method of the present disclosure may further include blocks S104 and S105, which may be performed before block S103.

S104: Measuring thickness of different portions of the alignment material layer 21.

S105: determining the first angle a based on the thickness of different portions of the alignment material layer 21 to prevent interference of an incident light and a reflected light of the alignment material layer 21.

By measuring the thickness of different portions of the alignment material layer 21, the first angle a may be determined according to the flatness of the whole alignment material layer 21 so as to prevent interference of the incident light and the reflected light of the alignment material layer 21.

In one embodiment, block S104 may particularly include: irradiating a laser on the alignment material layer 21 and deducing the thickness of different portions of the alignment material layer 2 based on the receiving time of the reflected laser.

In some cases, the fringe areas 201 exist at both sides of the substrate 20. Thus, when the second light 242 is irradiated on the alignment material layer 21 in block S103, the fringe area 201 located at the other side of the substrate 20 may receive less light amount due to the existence of the first angle a, resulting in the non-uniformity of alignment capacity of the alignment film. Therefore, according to another embodiment of the present disclosure, the alignment film manufacturing method of the present disclosure may further include block S106, which may be performed after block S103.

S106: Moving the substrate 20 at a third speed $V_3$ and irradiating the alignment material layer 21 with a third light 243 emitted by the light source 24, wherein a second angle b between an incident direction of the third light 243 and the substrate 20 may prevent interference of an incident light and a reflected light of the alignment material layer 21.

Figure 3:
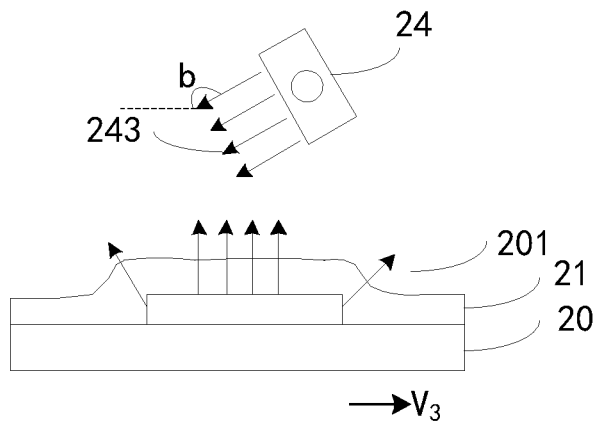
FIG. 3 illustrates the block S106 of the alignment film manufacturing method according to another embodiment of the present disclosure.

As shown in FIG. 3, in order to increase the accumulated light amount of the fringe area 201 at the other side of the substrate 20, the second angle b and the first angle a cannot be acute or obtuse at the same time. That is to say, when the first angle a is an acute angle the second angle b is an obtuse angle, and when the first angle a is an obtuse angle the second angle b is an acute angle.

In one embodiment, when the thickness and flatness of the alignment material layer 21 of the fringe areas 201 at both sides of the substrate 20 are the same, the sum of the first angle a and the second angle b may be equal to 180 degree, i.e., the angle between the incident direction of the second light 242 and the normal direction of the substrate 20 is equal to that between the incident direction of the third light 243 and the normal direction of the substrate 20.

In one embodiment, the fringe area 201 may only be a small portion of the whole alignment material layer 21. Therefore, while the accumulated light amount of the fringe area 201 is being increased in block S103 and S106, the light amount received by the whole alignment material layer 21 should not be larger than the light amount received by the whole alignment material layer 21 in block S102. Correspondingly, in block S103 and S106, the first speed $V_1$ may be lower than the second speed $V_2$ and lower than the third speed $V_3$, and/or, the first light 241 may be more intense than the second light 242 and more intense than the third light 243. Specifically, in one embodiment, the first light 241, the second light 242 and the third light 243 emitted by the light source 24 may be arranged to have the same intensity. In this embodiment, the first speed $V_1$ may be lower than the second speed $V_2$ and lower than the third speed $V_3$ such that the accumulated light amount received by the whole alignment material layer 21 in block S102 may be larger than the accumulated light amount in block S103 and S106. In another embodiment, the first speed $V_1$, the second speed $V_2$ and the third speed $V_3$ of the substrate 20 may be arranged to be identical, while the first light 241 may be arranged to be more intense than the second light 242 and more intense the third light 243. Apparently, in other embodiments, the speed of the substrate 20 in each block and the intensity of each light may be adjusted properly, as long as the accumulated light amount received by the alignment material layer 21 in block S102 is larger than the accumulated light amount received by the alignment material layer 21 in block S103 and S106.

Figure 4:
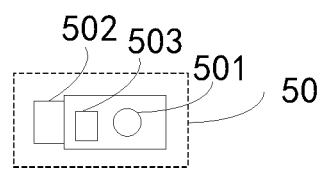
FIG. 4 is a schematic diagram of the apparatus for manufacturing an alignment film according to an embodiment of the present disclosure.

Referring to FIG. 4, FIG. 4 is a schematic diagram of the apparatus for manufacturing an alignment film according to an embodiment of the present disclosure. The manufacturing apparatus may include a motion-mechanism 40 and an irradiation-mechanism 50.

Figure 5:
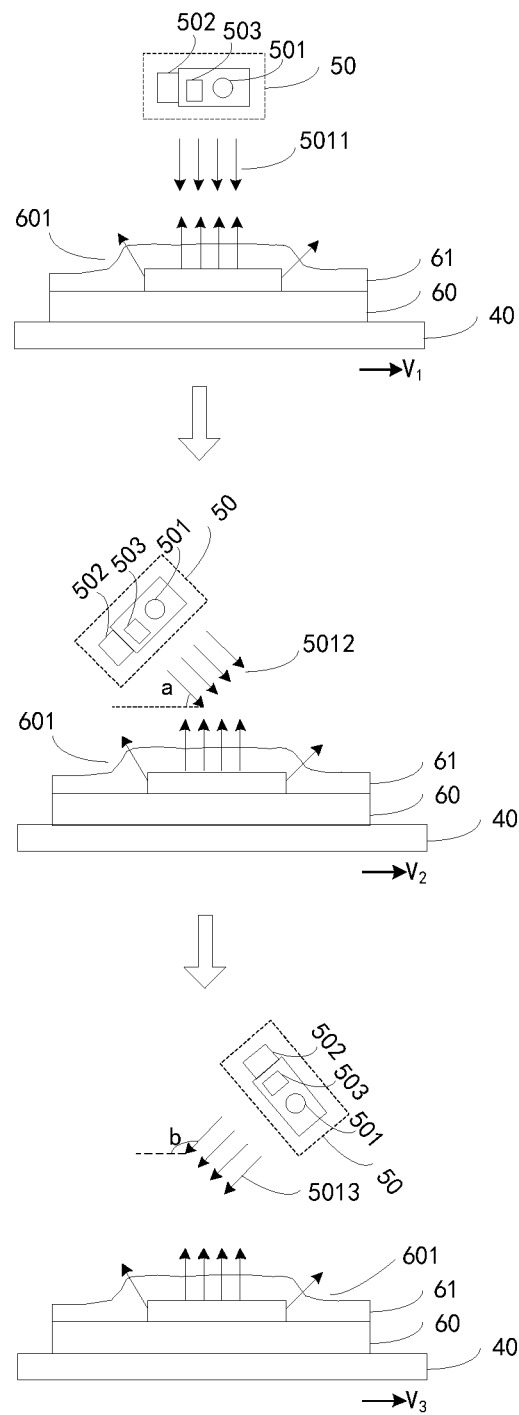
FIG. 5 illustrates the operation status of the apparatus of FIG. 4 during the alignment film manufacturing.

Referring also to FIG. 5, FIG. 5 illustrates the operation status of the apparatus of FIG. 4 during the alignment film manufacturing. The motion mechanism 40 may be utilized for the placement of a substrate 60 with an alignment material layer 61. The motion mechanism 40 may also be utilized to move the substrate 60. The irradiation-mechanism 50 may be configured to emit light for irradiating the alignment material layer 61 on the substrate 60 so as to form the alignment film having alignment function. Specifically, the light emitted by the irradiation-mechanism 50 may be polarized light. Optionally, the polarized light may be linearly polarized UV light.

Specifically, the motion-mechanism 40 moves the substrate 60 successively at a first speed $V_1$ and a second speed $V_2$. When the motion-mechanism 40 moves the substrate 60 at the first speed $V_1$, the irradiation-mechanism 50 may perpendicularly irradiate the alignment material layer 61 with a first light 5011. When the motion-mechanism 40 moves the substrate 60 at the second speed $V_2$, the irradiation-mechanism 50 may irradiate the alignment material layer 61 with a second light 5012. A first angle a between the incident direction of the second light 5012 and the substrate 60 may prevent interference of an incident light and a reflected light of the alignment material layer 61.

In one embodiment, as shown in FIG. 4, the irradiation-mechanism 50 may particularly include a light source 501, a detector 502 and a controller 503.

The light source 501 may be configured to emit the first light 5011 and the second light 5012. The detector 502 may be configured to measure thickness of different portions of the alignment material layer 61. The controller 503 may be configured to determine the first angle a based on the measurement result of the thickness acquired by the detector 502, and to control the light source 501 to emit the second light 5012.

In one embodiment, the detector 502 may be a laser detector and configured to emit laser towards the alignment material layer 61 so as to measure the thickness of different portions of the alignment material layer 61 based on the receiving time of the reflected laser. The controller 503 may deduce the flatness of the whole alignment material layer 61 to determine the first angle a, and to control the light source 501 to emit the second light 5012. In one embodiment, the light source 501 may rotate in a small range under the control of the controller 503.

As shown in FIG. 5, after moving the substrate 60 successively at the first speed $V_1$ and the second speed $V_2$, the motion-mechanism 40 may move the substrate 60 at a third speed $V_3$. When the motion-mechanism 40 moves the substrate 60 at the third speed $V_3$, the irradiation-mechanism 50 may irradiate the alignment material layer 61 with a third light 5013. A second angle b between the incident direction of the second light 5013 and the substrate 60 may prevent interference of an incident light and a reflected light of the alignment material layer 61. When the first angle a is an acute angle, the second angle b is an obtuse angle. When the first angle a is an obtuse angle, the second angle b is an acute angle. In one embodiment, when the flatness of the whole alignment material layer 61 is symmetric, the sum of the first angle a and the second angle b may be equal to 180 degree.

In one embodiment, the first speed $V_1$ may be lower than the second speed $V_2$ and lower than the third speed $V_3$, and/or, the first light 5011 may be more intense than the second light 5012 and more intense than the third light 5013.

The manufacturing apparatus may be utilized for any of the alignment film manufacturing methods mentioned above. For brevity, the method will not be discussed hereon.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. A method for manufacturing an alignment film, comprising:
   forming an alignment material layer on a substrate;
   measuring thicknesses of different portions of the alignment material layer;
   determining a first angle based on the thicknesses of the different portions of the alignment material layer, wherein the first angle prevents interference of a first incident light and a first reflected light of the alignment material layer;
   moving the substrate in a first direction at a first speed and meanwhile irradiating the alignment material layer with a first light from a light source, wherein the first light is perpendicular to the substrate;
   moving the substrate in the first direction at a second speed and meanwhile irradiating the alignment material layer with a second light from the light source, wherein an angle between the first incident direction of the second light and the substrate is equal to the first angle;
   moving the substrate in the first direction at a third speed and meanwhile irradiating the alignment material layer with a third light from the light source, wherein an angle between a second incident direction of the third light and the substrate is equal to a second angle, and the second angle prevents interference of the second incident light and a second reflected light of the alignment material layer;
   wherein, when the first angle is an acute angle, the second angle is an obtuse angle, and when the first angle is an obtuse angle, the second angle is an acute angle;
   wherein a same substrate is moved at the first speed, then at the second speed and finally at the third speed.

2. The method of claim 1, wherein the measuring of thickness of different portions of the alignment material layer comprises:
   utilizing a laser.

3. The method of claim 1, wherein
   the first speed is lower than the second speed and the first speed is lower than the third speed.

4. A method for manufacturing an alignment film, comprising:
   forming an alignment material layer on a substrate;
   moving the substrate in a first direction at a first speed and meanwhile irradiating the alignment material layer with a first light from a light source, wherein the first light is perpendicular to the substrate;
   moving the substrate in the first direction at a second speed and meanwhile irradiating the alignment material layer with a second light from the light source, wherein a first angle between a first incident direction of the second light and the substrate prevents interference of the first incident light and a first reflected light of the alignment material layer;
   wherein a same substrate is moved at the first speed and then at the second speed.

5. The method of claim 4, further comprising:
   before moving the substrate in the first direction at the second speed and irradiating the alignment material layer with the second light:
   measuring thicknesses of different portions of the alignment material layer;
   determining the first angle based on the thicknesses of the different portions of the alignment material layer to prevent interference of the first incident light and the first reflected light.

6. The method of claim 5, wherein the measuring of thicknesses of different portions of the alignment material layer comprises:
   utilizing a laser.

7. The method of claim 4, further comprising:
   moving the substrate in the first direction at a third speed and irradiating the alignment material layer with a third light from the light source, wherein a second angle between a second incident direction of the third light and the substrate prevents interference of the second incident light and a second reflected light of the alignment material layer;
   wherein, when the first angle is an acute angle, the second angle is an obtuse angle, and when the first angle is an obtuse angle, the second angle is an acute angle.

8. The method of claim 7, wherein
   the first speed is lower than the second speed and the first speed is lower than the third speed.

9. An apparatus for manufacturing an alignment film, comprising:
   a motion-mechanism, for a placement of a substrate with an alignment material layer and the motion-mechanism is configured to move the substrate, wherein the alignment material layer is disposed on the substrate;
   an irradiation-mechanism, configured to emit light for irradiating the alignment material layer on the substrate to form the alignment film with an alignment function;
   wherein, the motion-mechanism moves the substrate successively in a first direction at a first speed and a second speed, when the motion-mechanism moves the substrate in the first direction at the first speed, the irradiation-mechanism irradiates the alignment material layer with a first light perpendicular to the substrate; when the motion-mechanism moves the substrate in the first direction at the second speed, the irradiation-mechanism irradiates the alignment material layer with a second light, a first angle between a first incident direction of the second light and the substrate prevents interference of the first incident light and a first reflected light of the alignment material layer;
   wherein a same substrate is moved by the motion-mechanism at the first speed and then at the second speed.

10. The apparatus of claim 9, wherein the irradiation-mechanism comprises:
    a light source, configured to emit the first light and the second light;
    a detector, configured to measure thicknesses of different portions of the alignment material layer;
    a controller, configured to determine the first angle based on the thicknesses of the different portions of the alignment material layer, and to control the light source emitting the second light.

11. The apparatus of claim 10, wherein
    the detector is a laser detector, configured to emit laser light towards the alignment material layer to measure the thicknesses of the different portions of the alignment material layer.

12. The apparatus of claim 9, wherein
    after moving the substrate successively in the first direction at the first speed and the second speed, the motion-mechanism moves the substrate in the first direction at a third speed, when the motion-mechanism moves the substrate at the third speed, the irradiation-mechanism irradiates the alignment material layer with a third light, a second angle between a second incident direction of the third light and the substrate prevents interference of the second incident light and a second reflected light of the alignment material layer;

wherein, when the first angle is an acute angle, the second angle is an obtuse angle, and when the first angle is an obtuse angle, the second angle is an acute angle.

13. The apparatus of claim 12, wherein the first speed is lower than the second speed and the first speed is lower than the third speed.

14. The method of claim 1, wherein the first light is more intense than the second light and is more intense than the third light.

15. The method of claim 7, wherein the first light is more intense than the second light and is more intense than the third light.

16. The apparatus of claim 12, wherein first light is more intense than the second light and is more intense than the third light.

* * * * *